Feb. 7, 1933.   N. E. METHLIN   1,896,911
WHEELED GUN CARRIAGE ADAPTED TO BE TRANSFORMED RAPIDLY
INTO A GUN CARRIAGE FOR FIRING UPON AIRCRAFT
Filed Nov. 13, 1931   6 Sheets-Sheet 1

Inventor
Nicolas Emilien Methlin
By Cameron, Kerkam + Sutton
Attorneys.

Feb. 7, 1933. N. E. METHLIN 1,896,911
WHEELED GUN CARRIAGE ADAPTED TO BE TRANSFORMED RAPIDLY
INTO A GUN CARRIAGE FOR FIRING UPON AIRCRAFT
Filed Nov. 13, 1931 6 Sheets-Sheet 3

Inventor
Nicolas Emilien Methlin
By Cameron, Kerkam & Sutton
Attorneys

Feb. 7, 1933. N. E. METHLIN 1,896,911
WHEELED GUN CARRIAGE ADAPTED TO BE TRANSFORMED RAPIDLY
INTO A GUN CARRIAGE FOR FIRING UPON AIRCRAFT
Filed Nov. 13, 1931 6 Sheets-Sheet 6

Patented Feb. 7, 1933

1,896,911

UNITED STATES PATENT OFFICE

NICOLAS EMILIEN METHLIN, OF PARIS, FRANCE, ASSIGNOR TO SCHNEIDER & CIE., OF PARIS, FRANCE, A COMPANY OF FRANCE

WHEELED GUN CARRIAGE ADAPTED TO BE TRANSFORMED RAPIDLY INTO A GUN CARRIAGE FOR FIRING UPON AIRCRAFT

Application filed November 13, 1931, Serial No. 574,906, and in France June 10, 1931.

Guns mounted upon a train of wheels and having a relatively wide field of fire, both in elevation and in azimuth, are known. These guns comprise a system of trails pivoted to a head plate or to the axle of a gun carriage and adapted to be spread out to form a large anchoring base at the rear of the gun in order to mount the latter in battery position; the horizontal field of fire is limited by the angle formed between the anchored trails, while the limits of aim in elevation are such as to permit the gun to be employed for firing on aerial targets. These guns, however, are not perfectly suitable for firing upon such targets, in view of the fact that their horizontal field of fire is limited in the manner explained above.

Other guns are also known that are very suitable for firing upon aerial targets and for this purpose have an unlimited field of air in azimuth. These guns are not normally adapted for firing upon wheels. They most generally comprise a platform provided with arms and arranged as near the ground as possible so as to allow the gun recoiling on the carriage pivoted on the said platform to have complete freedom to recoil, whatever be the direction in which it is trained; in other words, the carriage, which carries the oscillating mass, can, by pivoting on the platform, sweep over the whole of the horizon and the oscillating mass can recoil suitably on the gun carriage while the gun can be trained without the anchoring arms of the platform impeding the recoil.

Figure 1:
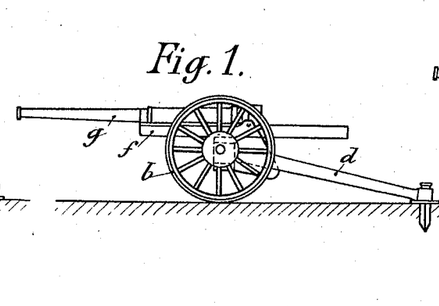
Figures 1, 1 bis and 2 are diagrammatic side, end and plan views, respectively, of a portable, double-trail gun in battery position.
Figure 2:
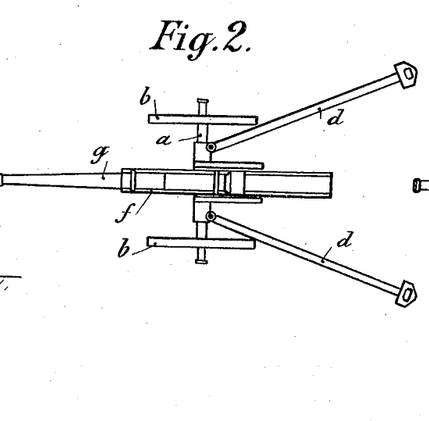
Figure 3:
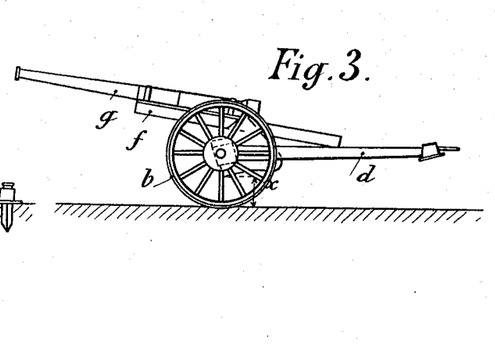
Figures 3 and 4 show the gun of Figures 1–2 in travelling position.
Figure 4:
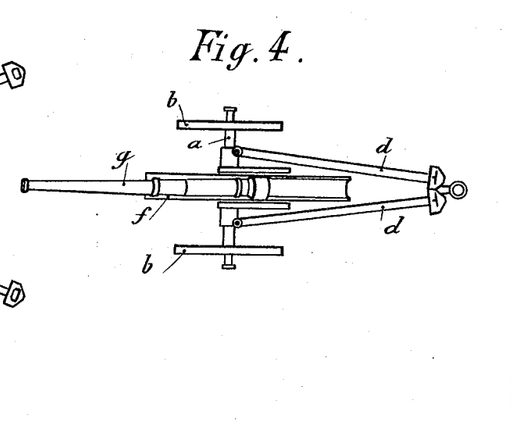

Guns mounted on wheels and having a large field of fire, which are provided with displaceable trails, can be towed by coupling directly on to the closed trails; or they can be employed for firing on wheels and be rapidly brought into the travelling position by simply raising the trails and bringing together their ends which will then be coupled up to a limber for example. This is the arrangement shown diagrammatically in Figures 1 to 4, in which figures 1, 1 bis and 2 represent diagrammatically in battery position a gun having two trails, while Figures 3 and 4 show the gun in the travelling position, in which the closed trails have been pivoted about their forward pivotal connection near the axle, and raised to a suitable level $x$ above the ground, which is necessary in order that the gun can be transported normally over the most varied kinds of ground.

As stated above, those guns which fire on a platform and permit the whole horizon to be covered have the advantage of possessing a horizontal arc of fire of 360°; but on the other hand they must comprise a platform which is very close to the ground, in order to permit the gun to recoil for all angles of elevation, so that the centre of gravity of the whole piece will not be at an excessive height tending to make the gun unstable when firing.

Figure 5:
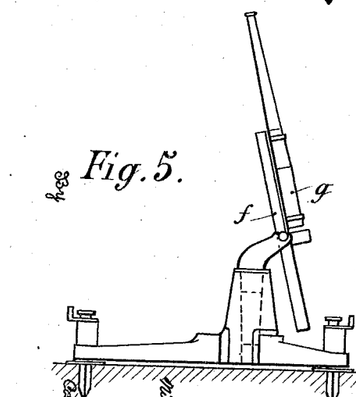
Figure 5 is a diagrammatic side view of an antiaircraft gun having a plurality of anchoring arms.

Figure 5 shows diagrammatically a similar gun comprising, most frequently, a plurality of arms for anchoring it to the ground. It is clear that such a gun, in order to be brought into the travelling position and mounted upon a transport vehicle, must be raised and secured to the vehicle at a suitable height, in order to permit it to travel over uneven ground as indicated above.

In order to change over from the normal firing position to the travelling position, it is consequently necessary to perform relatively important and lengthy operations which can in no way be compared with the simple operation of lifting the trails of a gun mounted on wheels and having a wide field of fire.

The present invention relates to an artillery gun designed in such a way as to permit practical use to be made of the advantages possessed by each of the types of gun mentioned above, without on the other hand retaining their disadvantages. In other words, the gun is so designed that, immediately the trails are lowered, the gun is ready for firing on wheels at a target situated at any altitude and with either a restricted horizontal field of fire or with a wide horizontal field of fire of the order of that possessed by the existing two-trail guns. Finally, the gun is adapted to be transformed immediately into a gun capable of firing over the whole circle of the horizon, by simply removing the wheels; the change-over from the firing position to the travelling position can be made very easily and very rapidly with this gun, by simply slipping the wheels on their stub axles and simply lifting the trails, the operations being practically almost as rapid as those carried out when changing over from the firing position into the travelling position in guns firing exclusively on wheels, on account of the practically total suppression of the vertical displacements to be given to the centre of gravity of the gun.

The new gun, according to the invention, is constructed as a gun carriage on wheels having a wide field of fire and split trails, and it is characterized by the feature that the head plate or the saddle to which the split trails are pivoted is constructed in the form of a ring forming a guide track for the top carriage, on which the oscillating mass is journalled, the latter being adapted to engage in the ring for the easy recoil of the barrel in all positions of elevation and direction. The saddle, which forms the front part of the system of trails, may be supported on the wheel train in any suitable manner, for example in the known manner by a longitudinal pivot permitting a transverse oscillation of the wheel system with respect to the trail system.

Such a gun may, as will be seen hereinafter, be employed in the manner indicated above for firing upon wheels when taken by surprise, firing upon wheels with a field of aim in direction of the order of that of the usual wide angle guns mounted upon wheels, and to be rapidly transformed into a gun capable of sweeping the whole circle of the horizon which itself can be retransformed very easily and rapidly into a gun mounted on wheels, for transport and travelling.

With a view to its transformation into a gun capable of sweeping the whole horizon, the gun comprises, in addition to the split trails, an arm adapted to be lifted for travelling and adapted to be anchored in the ground by its free end, in order to mount the gun in battery position for firing over the whole circle of the horizon.

In the drawings, wherein like reference characters indicate like parts throughout the several views.

As shown in these figures, the gun comprises, like the usual field guns, an axle $a$ mounted upon wheels $b$ and upon which is carried the gun carriage proper, formed by a saddle $c$ in the shape of a ring and to which are pivoted the split trails $d$. To the saddle, in the form of a ring-shaped track is also pivoted an arm $e$ constructed in such a way that it can be lifted into the travelling position shown in Figure 6 and hooked for example beneath the cradle $f$ in which the gun barrel $g$ recoils. A practical form of construction of the saddle forming a guide track will be described hereinafter.

Figure 6:
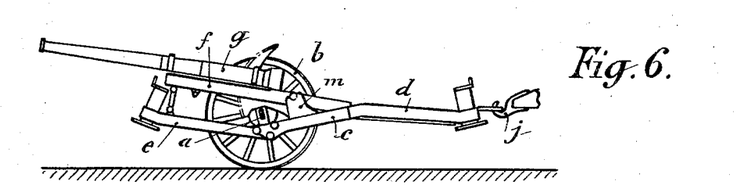
Figures 6 and 7 show a longitudinal elevation and a corresponding plan view of a gun comprising one embodiment of the present invention in the travelling position.
Figure 7:
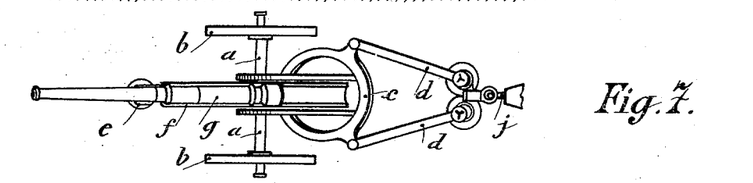

Figures 6 and 7 already show diagrammatically the general constructional principles of the new gun. The separable trails $d$ which can be raised in the manner of the usual trails for travelling purposes, are united by their ends, these united ends being adapted to be hitched on to a limber or other tractor vehicle of which the coupling hook $j$ only is shown.

It will immediately be seen that a gun thus designed permits, whatever be the manner in which it is employed, the engagement of the slide and the recoil of the gun barrel within the saddle for all inclinations, even for firing in a vertical position. The gun, it will be understood, can be employed in the event of a surprise after the manner of a single trail gun. For this purpose, it is sufficient to unhook the trails $d$ and lower them to the ground and to disengage the arm $e$ and also lower its end upon the ground. The gun can also be fired with or without anchoring the trails $d$ and the arm $e$.

Figures 8, 9, 10:
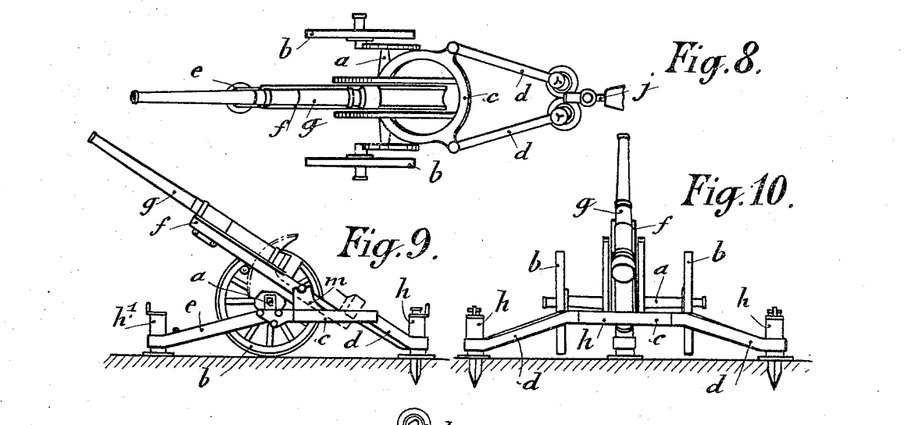
Figure 8 is a plan view of a modification, not of the gun itself, but of the system of wheels, the axle being, in this modification, carried in the known manner by springs on crank arms of which the branch parallel to the axle forms a stub-axle.
Figures 9, 10 and 11 are side, rear and plan views, respectively, of the embodiment of Figures 6 and 7 showing the gun in battery position without removal of the wheels.
Figure 11:
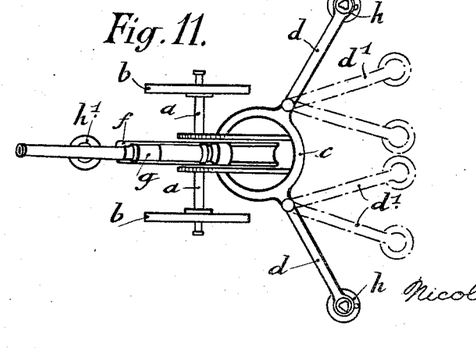

Further, the gun can be mounted in battery position without removing the wheels, and it may be transformed, like the usual double trail guns are transformed, into a gun having a wide field of fire limited in azimuth. For this purpose, it is sufficient, as shown in Figures 9, 10 and 11 in longitudinal elevation, end elevation and plan view respectively, to separate suitably the trails $d$ either as far as their limiting position shown in full lines, or to an intermediate position shown in dot-and-dash lines at $d^1$ in Figure 11, and to execute firing with the wheels bearing on the ground in the case when the axle can oscillate transversely; or else the wheels may be raised a suitable distance above the ground by means of the usual lifting jacks $h$ provided at the ends of the trails, or by means of a lifting jack $h^1$ provided at the end of the auxiliary arm $e$. The gun thus mounted in battery position will be able to fire as it would fire on wheels, while being practically ready for travelling, the sole operation to be carried out in order to prepare the gun for transport consisting in bringing the trails $d$ together and lifting the arm $e$ in order to hook it to the cradle.

Finally the gun may be transformed into a gun capable of firing over the whole circle of the horizon, in every way analogous and comparable in its effects to known guns capable of firing over the whole of this circle and mentioned above, simply by removing the set of wheels whether a trail of wheels is employed, as in the diagrams shown in Figures 6, 7, 9, 10 and 11, or wheels mounted upon crank arms and engaging upon an axle body which is left attached to the gun carriage.

Figure 12:
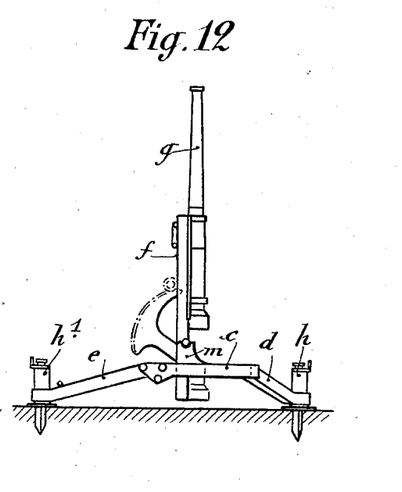
Figures 12, 13 and 14 are views corresponding to Figures 9, 10 and 11 but with the wheels removed.
Figure 13:
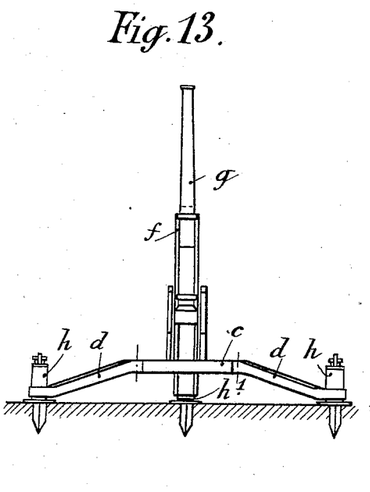
Figure 14:
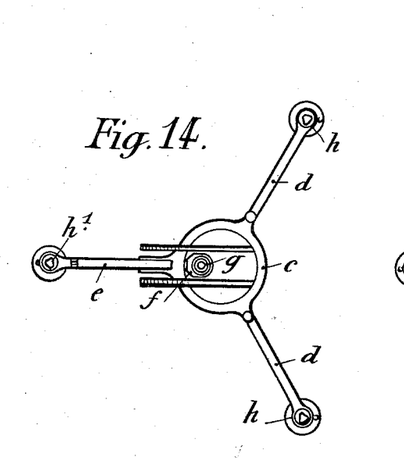
Figure 15:
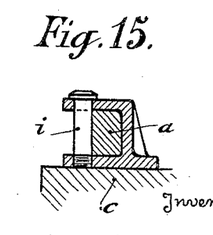
Figure 15 is a sectional view of a device for removably securing the axle of the wheels to the saddle.
Figure 16:
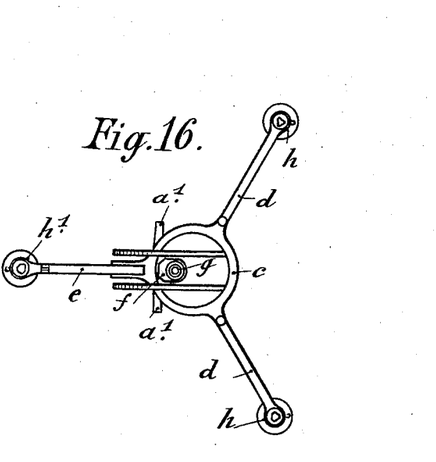
Figure 16 is a plan view similar to Figure 14 showing a modified form of wheel mounting axle.
Figure 17:
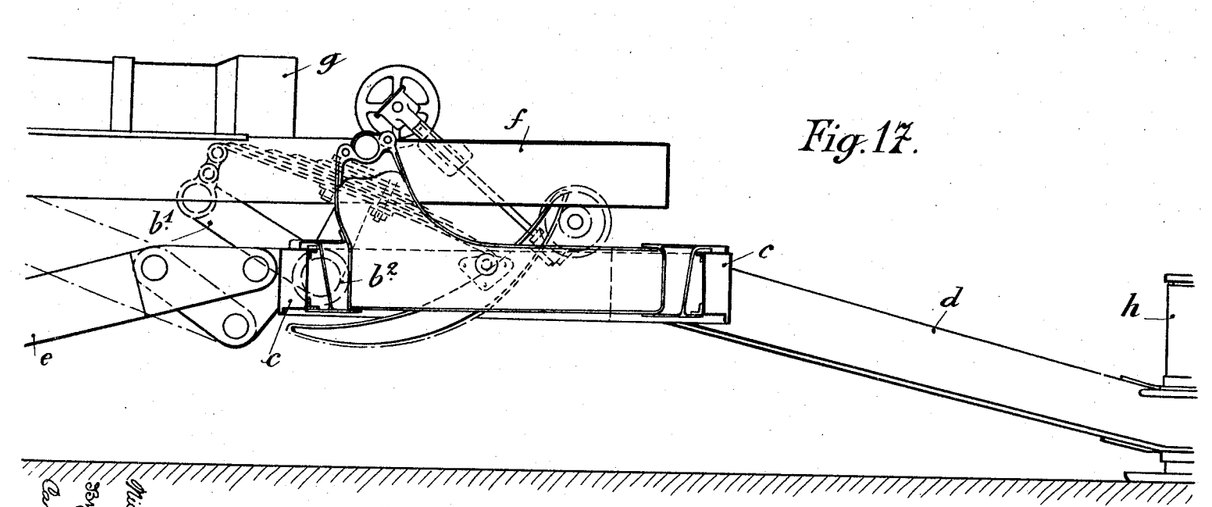
Figures 17 and 18 are a side elevation part in section and a plan view, respectively, of one form of gun carriage embodying the present invention.

Figures 12 and 13 show respectively in longitudinal elevation and in end view the gun mounted in battery position with the train of wheels removed. Figure 14 is a corresponding plan view. Figure 15 shows a simple device for engaging the axle $a$ on the saddle $c$, the train of wheels being then removed in a simple manner after removing the retaining members $i$. In the modification shown in diagrammatic plan view in Figure 16, and more fully in Figure 18, the axle body $a^1$ remains attached to the saddle $c$ and the wheels only are removed with their crank arms $b^1$, the horizontal branches $b^2$ engaging in sockets formed at the ends of the said axle body $a^1$.

In Figures 17-22, the ring $c$, forming a saddle and a guide track, is made up of a system of plates and iron sections of channel shape with the flanges turned inwards; the top carriage $m$ is rotatably mounted within the saddle by means of the rollers $k$ which bear upon these flanges $c^1$ $c^2$. These rollers may be journalled in brackets $m^1$ rigid with the top carriage $m$. As shown best in Figure 17, the slide $f$ supporting the gun $g$ is pivotally mounted on top carriage $m$ by suitable trunnions suitably positioned with respect to saddle $c$, the height of said trunnions above the plane of the saddle being in practice less than the length of slide $f$ to the rear of said trunnions, which length is in practice less than the distance from said trunnions to the diametrically opposite portion of saddle $c$. With this construction the center of gravity of the oscillating mass of the gun is maintained as low as possible, and yet elevation for high angle fire is permitted with the recoil taking place within annular saddle $c$. The construction shown in Figures 20-22 permits the rollers to be relieved in the event of abnormal stress and under the stresses set up during the firing.

Figure 20:
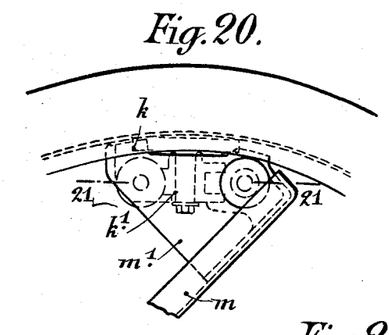
Figure 20 is a plan view on a larger scale of a portion of the structure shown in Figure 18.
Figure 21:
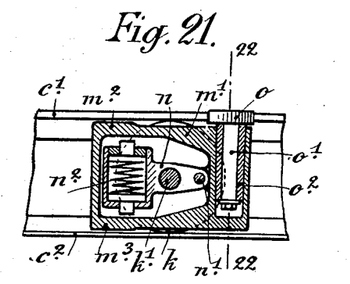
Figure 21 is a sectional view taken substantially on line 21—21 of Figure 20.
Figure 22:
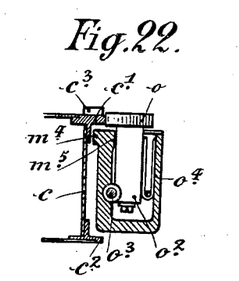
Figure 22 is a sectional view taken substantially on line 22—22 of Figure 21.

As shown in these figures, the axes $k^1$ of the rollers $k$ are journalled in arms $n$ pivoted at $n^1$ to the brackets $m^1$. These arms form by their free end a flexible member $n^2$ by means of which the normal stresses, apart from the firing, which the bracket receives from the top carriage, are transmitted by the roller to the saddle.

The firing stresses and abnormal stresses, whether these are directed upwardly or downwardly, are transmitted directly from the bracket to the saddle by the bosses $m^2$ or $m^3$ after having made the flexible member $n^2$ yield, and this limits the part of the total stress carried by the roller. Each of the brackets forms a bearing for the spindle $o^1$ of a horizontal roller $o$ by means of which the top carriage bears against the edge of the flange $c^1$ of the saddle.

In practice, as shown in the figures, the axis $o^1$ instead of being journalled directly in the bracket $m^1$, is journalled in a sheath $o^2$ which is pivoted at $o^3$ to this bracket and bears by means of a spring $o^4$ upon the vertical inner wall of the bracket.

The movement of this spindle $o^1$ under the influence of this spring is, moreover, limited by a stop $m^5$ formed upon the bracket. The stops $m^5$ of the various brackets of the gun carriage are adjustable in such a way that the circle enclosing all the rollers $o$ has a diameter very slightly smaller, than that of the vertical wall of the flange $c^1$.

This mode of suspension of the bearings of the rollers $o$ permits the latter to be relieved in the event of an abnormal transverse stress, this stress being transmitted directly by the bracket to the saddle by means of the boss $m^4$ after the compression of the spring $o^4$, which thus limits the part of the total stress carried by the roller.

Figures 18, 19:
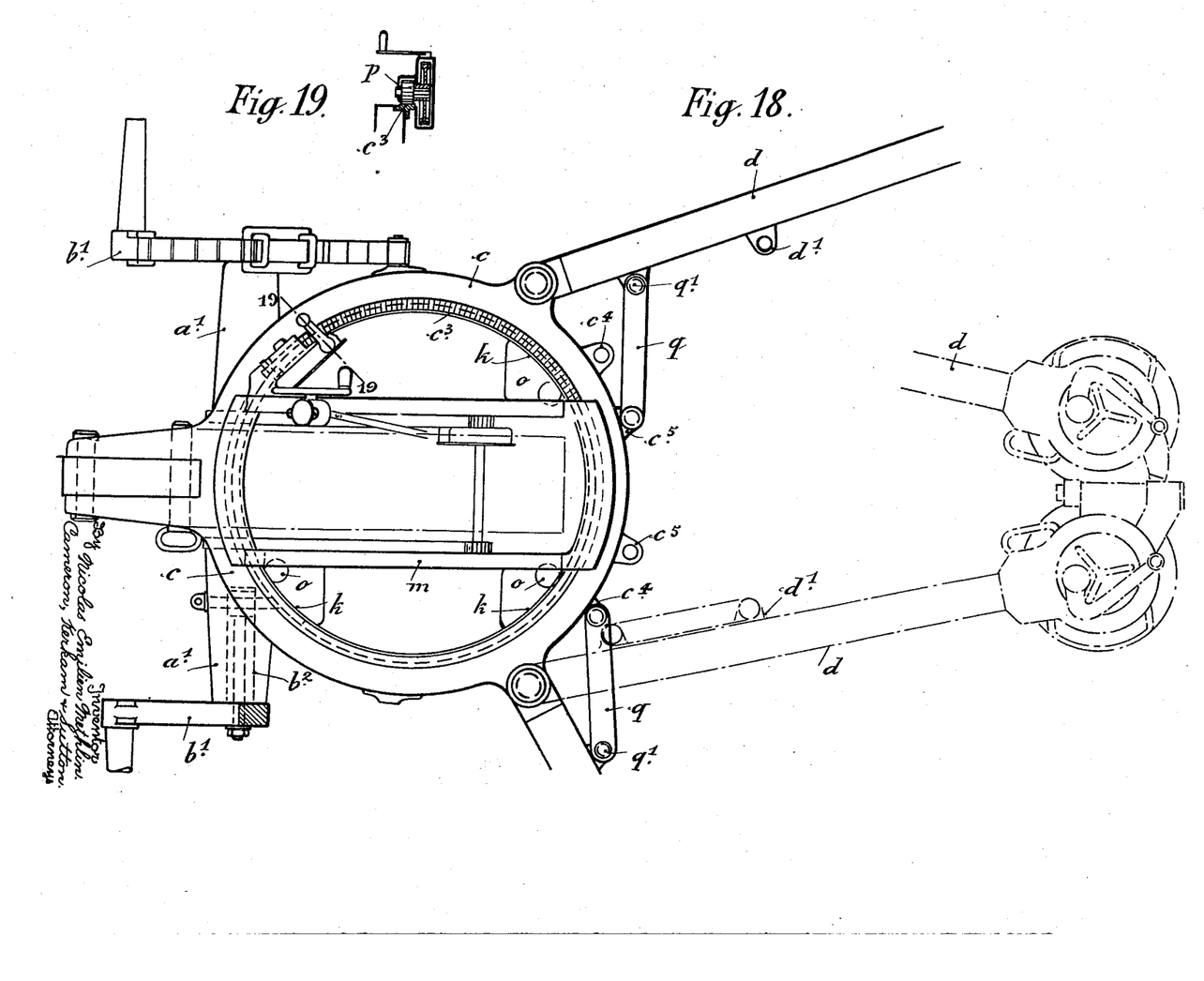
Figure 19 is a sectional view taken substantially on line 19—19 of Figure 18.

Naturally, the annular saddle $c$ may be provided with a toothed crown $c^3$ upon which travels, as shown in Figure 19, a pinion $p$ forming one of the parts of the mechanism, of known construction, which serves for displacing the top carriage $m$ in azimuth for aiming.

In practice, it is advantageous to provide a cross staying device between the trails $d$ and the saddles $c$ forming the guide track. This is shown in Figure 18. Links $q$ are pivoted at one end at $q^1$ to the corresponding trail $d$ and can be hooked at will to one or the other of the lugs $c^4$ or $c^5$ when they are hooked up by their opposite end.

Finally, this last mentioned end may be hooked on a lug $d^1$ on the corresponding trail. This permits the trails $d$ to be locked with the ring $c$ in the position indicated in full lines on the lower half of Figure 18, or in position indicated in full lines on the upper half of this figure.

Finally, when it is desired to bring the trails together for travelling purpose, the links $q$ are lowered into the position shown in dot-and-dash lines on the lower half of this Figure 18.

Naturally, the number of points at which the carriage is supported on the ground is not limited to three. In the case when there are four points of support, certain of the trails may be connected rigidly to the saddle and serve for coupling it to the transport vehicle. Two lateral trails will then turn about any suitable axis in such a way that they can be raised from the ground during transport.

The liftable arm $e$ will be similar to that in the three-trail guns illustrated.

Figure 23:
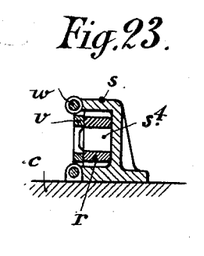
Figures 23, 24 and 25 are sectional, elevation and plan views, respectively, of an oscillating removable axle adapted for use in combination with the gun carriage of the present invention.
Figure 24:
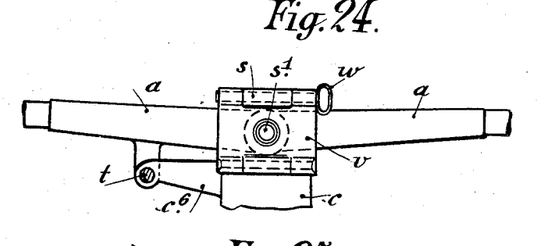
Figure 25:
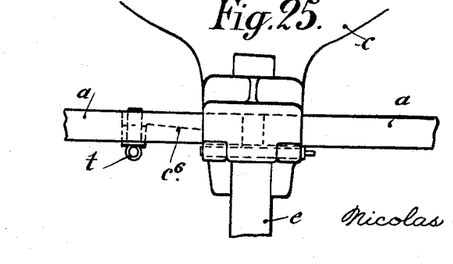

In Figures 23–25, the axle $a$ carries the saddle $c$ by means of the horizontal shaft $s^1$ forming part of a yoke or bracket $s$ fixed on the saddle $c$. This axle is held by a handwheel $v$ pivoted to the said yoke and locked on the latter by a locking pin $w$.

During transport and during firing with closed trails, any oscillation is prevented by means of a locking pin $t$, which connects the axle $a$ to an arm $c^6$ projecting from the saddle.

When firing on wheels with open trails, the locking pin $t$ is disengaged and the axle can oscillate about the pivot in a known manner.

In order to remove the train of wheels for firing around the whole circle of the horizon, it is sufficient to withdraw the locking pin $w$ and lower the hinged plate $v$ in order to liberate the axle.

I claim:

1. In a split trail wheeled gun mount of the type adapted to be rapidly transformed for anti-aircraft firing, an annular saddle, transportation means removably mounted on said saddle, a plurality of trails pivotally connected to said saddle and provided with ground engaging means for supporting said saddle independently of and at substantially the same height as said transportation means, a top carriage for the gun rotatably mounted within said annular saddle and adapted for training through 360°, and a gun supporting slide pivotally mounted on said top carriage, the length of said slide to the rear of its pivot point being less than the distance from said pivot point to the diametrically opposite portion of the interior of said saddle.

2. In a split trail wheel gun mount of the type adapted to be rapidly transformed for anti-aircraft firing, an annular saddle, transportation means removably mounted on said saddle, a plurality of trails pivotally connected to said saddle and provided with ground engaging means for supporting said saddle independently of and at substantially the same height as said transportation means, a top carriage for the gun rotatably mounted within said annular saddle and adapted for training through 360°, and a gun supporting slide pivotally mounted on said top carriage, said saddle, top carriage and slide being so constructed and arranged as to permit the rear end of said slide and gun to pass through the bore of said annular saddle for elevation and recoil purposes.

3. In a gun mount, an annular saddle, a top carriage supporting the gun, means for mounting said top carriage in said saddle for rotation therewithin including a plurality of brackets rigid with the top carriage circumferentially spaced within the annular saddle, a plurality of arms each pivotally secured at one end to one of said brackets, and a roller journalled in each of said arms intermediate the pivoted and free ends thereof, said rollers travelling in a track formed by the upper and lower horizontal flanges of said saddle, and resilient means interposed between the free end of each of said arms and its associated bracket whereby relative movement is permitted between said rollers and said top carriage under normal stresses exerted upon the latter.

4. In a gun mount, an annular saddle, a top carriage supporting the gun, means for mounting said top carriage in said saddle for rotation therewithin including a plurality of brackets rigid with the top carriage circumferentially spaced within the annular saddle, a plurality of arms each pivotally secured at one end to one of said brackets, and a roller journalled in each of said arms intermediate the pivoted and free ends thereof, said rollers travelling in a track formed by the upper and lower horizontal flanges of said saddle, and means for relieving said rollers from abnormal stresses exerted upon said top carriage comprising an upper and a lower boss on each of said brackets, said bosses projecting between the horizontal flanges of said saddle but normally spaced therefrom, and resilient means interposed between the free end of each of said arms and the upper and lower surfaces of said brackets whereby any abnormal stresses exerted on said top carriage first cause relative movement between said carriage and said rollers until either the top or bottom boss engages the adjacent flange of said saddle, and are thereafter transmitted directly to said saddle.

5. In a portable gun mount, a saddle mounted directly upon the transportation means, a top carriage supporting the gun, means for mounting said top carriage in said saddle for rotation relative thereto including one set of roller means having horizontal axes of rotation and another set of roller means having vertical axes of rotation, both of said sets being carried by said top carriage and engaging horizontal and vertical surfaces, respectively, on said saddle, means for yieldingly resisting both vertical and horizontal bodily movements of said top carriage relative to said sets of roller means and saddle under normal stresses exerted on said top carriage, and means for positively limiting said movements to predetermined amounts whereby abnormal stresses are transmitted directly from said top carriage to said saddle.

6. In a portable gun mount, a saddle mounted directly upon the transportation means, a top carriage supporting the gun, means for mounting said top carriage in said saddle for rotation relative thereto including a plurality of roller members carried by said top carriage and in bearing engagement with a vertical surface of said saddle, means for yieldingly resisting bodily movement of said top carriage relative to said roller members and saddle in a direction substantially transverse to the axis of rotation under normal stresses exerted on said top carriage, and means for positively limiting said relative movement to a predetermined amount whereby abnormal stresses are transmitted directly from said top carriage to said saddle.

7. In a gun mount, an annular saddle, a top carriage supporting the gun, means for mounting said top carriage in said saddle for rotation therewithin including a plurality of brackets rigid with the top carriage circumferentially spaced within the annular saddle, a plurality of bearing sleeves each pivotally secured at one end to one of said brackets, and a roller journalled in each of said bearing sleeves and supported thereby in engagement with the vertical face of said saddle, and resilient means interposed between each of said bearing sleeves and its associated bracket whereby relative movement is permitted between said rollers and said top carriage under normal stresses exerted upon the latter.

8. In a gun mount, an annular saddle, a top carriage supporting the gun, means for mounting said top carriage in said saddle for rotation therewithin including a plurality of brackets rigid with the top carriage circumferentially spaced within the annular saddle, a plurality of bearing sleeves each pivotally secured at one end to one of said brackets, and a roller journalled in each of said bearing sleeves and supported thereby in engagement with the vertical face of said saddle, and means for relieving said rollers from abnormal stresses exerted upon said top carriage comprising an abutting stop formed on each of said brackets, said stops being adjacent the vertical face of said saddle but normally spaced therefrom, and resilient means interposed between each of said bearing sleeves and its associated bracket whereby any abnormal stresses exerted on said top carriage first cause relative movement between said carriage and said rollers until said stops engage the adjacent face of said saddle, and are thereafter transmitted directly to said saddle.

In testimony whereof I have signed this specification.

NICOLAS EMILIEN METHLIN.